United States Patent

Ito et al.

Patent Number: 5,895,181
Date of Patent: Apr. 20, 1999

[54] DYNAMIC ERROR CORRECTING SYSTEM IN A NUMERICALLY CONTROLLED MACHINE TOOL

[75] Inventors: Koichi Ito, Osaka; Kazunori Masamoto, Mino; Hiroshi Yamashita, Itami; Hideo Nakagawa, Osaka-fu; Mikito Kumagai, Itami, all of Japan

[73] Assignee: OKK Corporation, Osaka-Fu, Japan

[21] Appl. No.: 08/701,698

[22] Filed: Aug. 22, 1996

[30] Foreign Application Priority Data

May 29, 1996 [JP] Japan ................................ 8-158921

[51] Int. Cl.⁶ ................................................ B23Q 23/00
[52] U.S. Cl. ................... 409/132; 364/474.12; 409/147; 409/149; 409/193; 409/239
[58] Field of Search ............................... 408/10, 13, 1 R; 409/80, 131, 132, 147, 148, 149, 151, 153, 193, 238, 239; 364/474.01, 474.12

[56] References Cited

U.S. PATENT DOCUMENTS 5,011,345  4/1991  Nishigai et al. ............... 364/474.12
5,214,592  5/1993  Serizawa et al. ................... 409/238

FOREIGN PATENT DOCUMENTS 178625    11/1982  Japan ................................ 409/193
196953    11/1983  Japan ................................ 409/238
44558     3/1986   Japan ................................ 409/151
274951    11/1989  Japan ................................ 409/238
7-246546  9/1995   Japan .

*Primary Examiner*—Daniel W. Howell
*Attorney, Agent, or Firm*—Nikaido Marmelstein Murray & Oram, LLP

[57] ABSTRACT

A feedrate and travelling distance before the feed orientation of a feed drive axis is obtained by analyzing NC programs when carrying out a machining action, and the lost motion correcting quantity corresponding to said feedrate and travelling distance is calculated by using the relationship obtained in advance by experiments. Furthermore, the lost motion correcting quantity obtained by calculations is overlapped onto the instruction value to a servo motor which drives the feed drive axis, when the feed orientation of said feed drive axis is reversed.

11 Claims, 9 Drawing Sheets

INTERPOLATING SYSTEM OF SYNTHETIC DYNAMIC ERRORS OF NC MACHINE TOOL

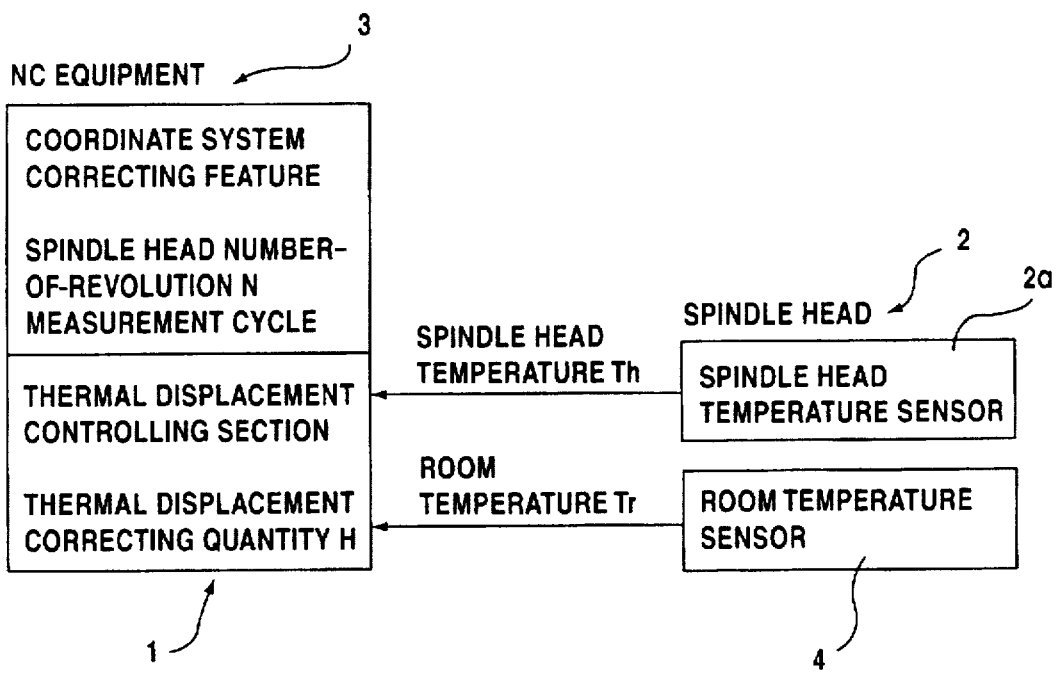

CONVERSION TABLE A

|  |  | P1 | P2 | P3 | P4 |
|---|---|---|---|---|---|
| G1a | La | Ha1 | Ha2 | Ha3 | Ha4 |
|  | Lb | Ha5 | Ha6 | Ha7 | Ha8 |
|  | Lc | Ha9 | Ha10 | Ha11 | Ha12 |
| G1b |  | Hb1 | Hb2 | Hb3 | Hb4 |
| G1c | La | Hc1 | Hc2 | Hc3 | Hc4 |
|  | Lb | Hc5 | Hc6 | Hc7 | Hc8 |
|  | Lc | Hc9 | Hc10 | Hc11 | Hc12 |
| G0 |  | H01 | H02 | H03 | H04 |

CONVERSION TABLE B

INTERPOLATING SYSTEM OF SYNTHETIC DYNAMIC ERRORS OF NC MACHINE TOOL

DYNAMIC ERROR CORRECTING SYSTEM IN A NUMERICALLY CONTROLLED MACHINE TOOL

BACKGROUND OF THE INVENTION

In a numerically controlled machine tool (hereinafter called "NC machine tool"), a displacement error is produced from time to time between the spindle and a workpiece according to the running conditions, thereby causing a machining accuracy to be changed. A drive section is one of the factors that may cause such dynamic errors. The drive section is roughly divided into the spindle head and feed drive section. Thermal displacement due to heat generation at the bearings, gear drive system, etc. In line with the spindle rotation in the spindle head and lost motions in reversing of the feed direction in addition to thermal displacement due to heat generation of ball screws in the feed drive section adversely influence the dynamic errors to a large extent.

As regards the accuracy errors due to thermal displacement, such a system is currently employed, in which the displacement quantity of the spindle head and ball screws is measured, stopping the spindle rotation and feed drive while the machine is running or during machining, a correcting quantity of thermal displacement is inputted in numerical control equipment (hereinafter called "NC equipment") on the basis of the result of measurement, and a reference zero point correction is performed from time to time. However, not only is the error correcting through measurement not efficient but also the measurement accuracy by devices, measurement errors, etc. will be reflected in the correcting quantity as they are. Therefore, there are many cases where it is difficult to secure the reliability.

The feed drive in an NC machine tool is such that generally rotation of servo motors of each feed drive axis is converted to linear movements of table, etc., via a feed drive system such as ball screws. However, there are cases where an error is generated between the stop position by positioning in the positive orientation to a specified position and the stop position by positioning in the negative orientation. This error is generally called "lost motion". This lost motion is produced by complicated influences due to backlashes, elastic deformation of the feed drive system, friction of guideways by which a table, etc. is guided, etc. When, in a positioning movement of the feed drive axis, reversing the orientation of feed after the table, etc. is moved in the positive or negative orientation, a time lag is produced by this lost motion between an instruction to the servo motor from the NC equipment and the actual movement of the table, etc. When carrying out an interpolation by simultaneous plural axes, for example, changing the quadrant in a circular interpolation, there exist an axis which is reversed and an axis which is not reversed, at the same time. Therefore, the synchronousness of the actual movement of each axis is lost to cause an error to be produced in the motion locus. Resultantly, there causes such a problem that overcutting or undercutting may occur in a workpiece to cause the shape accuracy such as roundness, etc. of a product to be deteriorated.

As regards a problem of lost motions, such a method as to balance the lost motion quantity is employed at present, in which a correcting quantity is overlapped to the instruction values given to servo motors for two kinds of feedrates G0 and G1 when the feed orientation of the feed drive axis is reversed. General NC equipment is provided with such a correcting feature. Usually, this feature is called a backlash correcting feature. However, if the lost motion quantity is changed according to various running conditions since the correcting value is generally fixed in this correcting method, a sufficient correcting effect is not able to be obtained, or excessive correction is performed, whereby the machining accuracy may be further worsened.

Furthermore, an optimal backlash correcting method for various feedrates has been proposed (by, for example, Japanese Patent Publication No. Hei-7-71781). However, since the lost motion quantity is not determined by only the feedrate, a sufficient effect is not able to be expected with only this method.

It is therefore an object of the invention to provide a dynamic error correcting system which is able to interpolate synthetic dynamic errors of an NC machine tool and to maintain the machining accuracy by giving corrections to thermal displacements of the spindle head and the feed drive system, and the lost motions.

SUMMARY OF THE INVENTION

With the invention, thermal displacement of the spindle head is corrected in such a manner that the room (ambient) temperature, spindle head temperature, and spindle rotations are selected as factor values pertaining to the thermal displacement of the spindle head, a relationship between the factor values and the thermal displacement quantity of the spindle head is obtained in advance through experiments, the thermal displacement quantity of the spindle head is calculated and estimated from time to time, using the relationship obtained through said experiments, from the input data of said factor values when conducting machining actions on the basis of instruction of numerical control programs (hereinafter called "NC program") of NC equipment, the thermal displacement correcting quantity is calculated from time to time from the thermal displacement quantity obtained by said calculation, using a first order lag expression, and the thermal displacement correcting quantity obtained by said calculation is given to a coordinate correcting feature of the NC equipment, whereby the reference zero correcting is carried out.

Furthermore, the thermal displacement of a ball screw is corrected in such a manner that a ball screw heat generation quantity (Q) is calculated from the number (N) of revolutions of motor per sampling unit time ($\Delta$Ts) in a control unit time (Ts) and the ratio (q; rotation time ratio) of motor rotation within the control unit time (Ts), an estimated value ($\Delta$L) of the thermal displacement of a ball screw is obtained from the heat generation quantity (Q), a correcting area in which a correction must be added to the pitch error correcting quantity of a memory type pitch error correcting feature of NC equipment, the estimated value ($\Delta$L) is given to either of the negative side and positive side area boundary points of said correcting area, and the estimated value ($\Delta$L) is linearly and uniformly assigned and added to the respective points in the correcting area, whereby the correction is enabled by amending the pitch error correcting quantity.

Furthermore, the lost motion of the feed drive section is corrected in such a manner that a relationship between the feedrates of feed drive axis, travelling distance thereof and the lost motion is obtained in advance by experiments, the feedrate and travelling distance before the feed orientation of the feed drive axis is reversed are obtained when performing a machining action on the basis of instructions of NC program, the lost motion correcting quantity corresponding to the feedrate and travelling distance before the feed orientation of the feed drive axis is reversed is calculated by using the relationship obtained by the above experiments, and the lost motion correcting quantity obtained by this calculation is overlapped onto the instruction values to a servo motor which drives the feed drive axis when reversing the feed orientation of the feed drive axis.

BRIEF DESCRIPTION OF THE DRAWINGS

FIG. 1 is a linear block diagram showing a thermal displacement correcting means of a spindle head.

FIG. 2 is a table of parameters in the thermal displacement correcting means of a spindle head.

DESCRIPTION OF PREFERRED EMBODIMENTS

Figure 3:
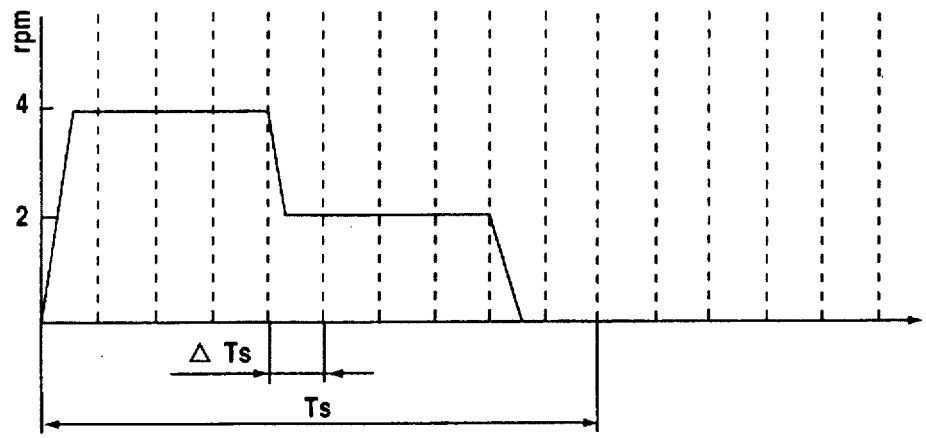
FIG. 3 is a view showing the number of revolutions of motor in term of control unit time.

Preferred embodiments of the invention will be described below.

Firstly, a description is given of a spindle head thermal displacement correcting means. FIG. 1 is a linear block diagram showing a thermal displacement correcting means of a spindle head. In a thermal displacement correcting section 1 are inputted the number N of spindle revolutions from NC equipment 3, the temperature Th of the spindle head 2 from spindle head temperature sensor 2a attached to the spindle head 2, and the room (ambient) temperature Tr from a room temperature sensor 4. Furthermore, for example, a table of parameters as shown in FIG. 2, which is prepared in advance by obtaining through experiments the relationship between the number N of spindle revolutions, spindle head temperature Th, room temperature Tr and thermal displacement of the spindle head 2, is registered in the thermal displacement correcting section 1. The table of parameters shown in FIG. 2 is such that the thermal displacement quantities (μm) of the spindle head 2, which are measured in advance by experiments, are assigned to each matrix composed of 1 to 10 lines, in which the number N of spindle revolutions is converted to voltage values (V) of a drive motor which drives the spindle and is displayed, and 1 to 10 rows in which the temperature differences (°C.) between the spindle head temperature Th and room temperature Tr are displayed.

The thermal displacement correcting section 1 calculates and presumes, from time to time, the thermal displacement quantity of the spindle head 2 from the input data pertaining to the number N of spindle revolutions, spindle head temperature Th and room temperature Tr, using the table of parameters shown in FIG. 2, when carrying out machining actions on the basis of instructions of NC program of the NC equipment 3, calculates the thermal displacement correcting quantity H from said thermal displacement quantity, using a first order lag expression, and gives said thermal displacement correcting quantity H to the coordinate system correcting feature of the NC equipment 3, whereby the reference zero point of the coordinate system is corrected.

The thermal displacement correcting quantity H is calculated, for example, as shown below. In a case where the motor voltage value inputted into the thermal displacement correcting section 1 is 5.8 V (this corresponds to the number N of spindle revolution. The matching relationship between the number N of spindle revolutions and the motor voltage value is obtained in advance through calculations), and the difference between the spindle head temperature Th and room temperature Tr is 4.5° C., the estimated value of thermal displacement quantity when the temperature difference is 40° C. at 5.8 V is given by the following expression:

$$50+(60-50)\times(5.8-5)=58 \text{ μm}.$$

Next, the estimated value of thermal displacement quantity when the temperature difference is 5° C. at 5.8 V is given by the following expression:

$$70+(70-70)\times(5.8-5)=70 \text{ μm}.$$

Therefore, the estimated value for the temperature difference 4.5° C. at 5.8 V will be:

$$58+(70-58)\times(4.5-4)=64 \text{ μm}.$$

That is, 64 μm is the thermal displacement quantity of the spindle head 2. However, the thermal displacement at this moment will appear according to the first order lag expression.

Using the first order lag expression $Y=(1-e^{-t/a})$, where t is the time required from the closing of power source to this moment, and a is a time constant (which is obtained in advance by experiments).

$$64 \times (1-e^{-10/60}) = 18.142 \approx 18 \ \mu m.$$

Therefore, the thermal displacement correcting quantity is 18 μm. The thermal displacement correcting section 1 gives this thermal displacement correcting quantity of 18 μm to the coordinate system correcting feature of NC equipment 3 and carries out a correction of the reference zero point of the coordinate system.

As described above, by correcting the thermal displacement of the spindle head 2, it is possible to cope with minute and complicated changes of the number N of spindle revolutions, spindle head temperature Th and room temperature Tr, and it is also possible to perform a highly accurate and simple correction.

In a case where a measurement cycle such as a touch sensor, etc., is concurrently used, a correction control by the above calculation is interrupted when measurement is carried out by said measurement cycle (incorporated in the custom section of said NC equipment 3), and the value obtained by subtracting the actually calculated value of said thermal displacement correcting quantity H immediately before commencement of the measurement from the value measured in said measurement cycle is given to the coordinate system correcting feature of said NC equipment 3, thereby correcting the coordinate system, whereby it is possible to settle the error between the actually calculated value of the thermal displacement correcting quantity H and the actual thermal displacement quantity. When a correction of the error of the coordinate system is completed upon completion of the measurement, a correcting control is again commenced by said calculation.

Next, a description will be given of the ball screw thermal displacement correcting means. The thermal displacement $\Delta L$ of the ball screw in the axial direction thereof is able to be expressed by the following expression (1):

$$\Delta L = L \cdot \rho \cdot \theta \qquad \text{Expression (1)}$$

where L=total length of a ball screw, ρ=thermal expansion coefficient of the ball screw, and θ=temperature rise value.

The temperature rise value θ of the ball screw is able to be expressed by the following first order lag expression (2):

$$\theta = Q\{1-\exp(-t/\tau)\} \qquad \text{Expression (2)}$$

where Q=heat generation quantity, t=time from the commencement, and τ=time constant.

And it is possible to introduce the following first order lag expression (3) from the expressions (1) and (2):

$$\Delta L = L \cdot \tau \cdot Q\{1-\exp(-t/\tau)\} \qquad \text{Expression (3)}$$

wherein the heat generation quantity Q is estimated from the following expression (4) by the number N of revolutions of motor which drives the ball screw:

$$Q = K \cdot N \cdot q \qquad \text{Expression (4)}$$

where K=coefficient (obtained by experiments), N=number of revolutions per sampling unit time ΔTs, which is the average value of the number of revolutions of motor within the control unit time Ts (cycle time of the correcting calculation), and q=action/time ratio within the control unit time Ts (the ratio of the time during which the motor rotates within Ts).

N and q in expression (4) are able to be obtained as shown below. For example, where the motor rotates at the number of revolutions shown in FIG. 3 at the control unit time Ts, average value N of the number of revolutions=(4+4+4+4+2+2+2+2)/8=3 action/time ratio q=8/10=0.8

N·q=3×0.8=2.4

That is, they can be obtained as described above. Furthermore, it is all right to optionally determine the control unit time Ts and sampling unit time ΔTs. However, in FIG. 3, it is assumed that the control unit time Ts is 10 seconds or so, and this control unit time is divided into ten sampling unit times ΔTs (1 second or so). The heat generation quantity Q will be decided by expression (4) from (N·q) thus obtained.

Next, the time constant τ at the first order lag expression (3) is obtained as shown below, from the result of experiments. Furthermore, the time constant τ when heat is being generated (when the machine power source is turned on: q>0) is different from that when heat is being radiated (when the machine power source is turned off: q=0). The time constant τ when heat is radiated is able to be primarily obtained from a heat radiation curve of ball screw which is obtained by experiments. However, since the time constant τ for heat generation may differ, depending on the number of revolutions, it is not possible to obtain the time constant τ for heat generation by an approximation method as in the time constant for heat radiation. As a matter of course, although it is possible to analyze and calculate the time constant from the temperature rise curve of a ball screw, which is obtained by experiments, as a function of the time and number of revolutions, a very complicated calculation process is required. Therefore, in this preferred embodiment, a curve (obtained by experiments) which expresses the relationship between the number of revolutions and time constant, which is obtained by the temperature rise curve of a ball screw, is divided into a plurality of areas depending upon the number of revolutions, the curve is linearly approximated at every area of the number of revolutions, whereby the time constant τ is obtained. For example, the curve which expresses the relationship between the number of revolutions and time constant is divided into three areas (N≧H, H>N≧M, M>N) of the number of revolutions, placing boundaries at two threshold values (H, M:H) M) of the number of revolutions, and the time constants are obtained from the above curves by linear approximation at every area of the number of revolutions:

When N≧H, τ=τ H

When H>N≧M, τ=τ M

When M>N, τ=τ L

In the case of heat radiation, the time constant τ is able to be obtained from the heat radiation curve obtained by experiments as τ=τ 0 (heat radiation time constant).

And it is possible to obtain the thermal displacement quantity ΔL of the ball screw from the heat generation quantity Q and time constant τ by the following first order lag expression (3):

$$\Delta L = L \cdot \rho \cdot Q\{1-\exp(-t/\tau)\} \qquad \text{Expression (3)}$$

When carrying out a calculation process, the first order lag expression (3) may be approximated by using the following Runge-Kutta method:

$$K_1 = \Delta t\{u-(x)/\tau$$

$$K_2 = \Delta t\{u-(x+K_1/2)\}/\tau$$

$$K_3 = \Delta t\{u-(x+K_2/2)\}/\tau$$

$$K_4 = \Delta t\{u-(x+K_3)\}/\tau$$

$K_5=\{+\{K_1+2K_2+2K_3+K_4\}/6$ where u=input, x=output, τ=time constant, and Δt=time interval.

Furthermore, the maximum value ΔLmax is installed in the estimated value ΔL of thermal displacement quantity, and in a case where the estimated value ΔL obtained by calculations exceeds the maximum value ΔLmax, the estimated value ΔL is clamped for the maximum value ΔLmax. Still furthermore, it is assumed that a correcting calculation program is commenced from the time when the power source is turned on (the power source turning on time is regarded as the initial time), the influence due to the initial temperature and ambient temperature is disregarded, and correction is taken in the direction extending from the initial length at the initial time but no correction is taken in the contracting direction thereof.

Figure 4:
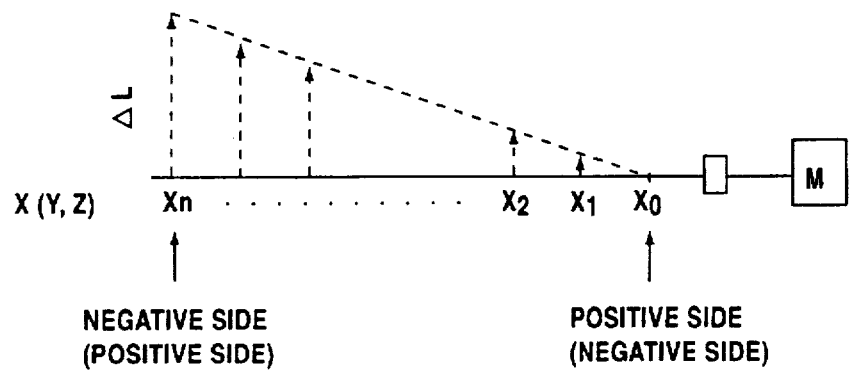
FIG. 4 is a view showing a method for sharing and adding the estimated values ΔL of thermal displacement in a thermal displacement correcting means of a ball screw.
Figure 5:
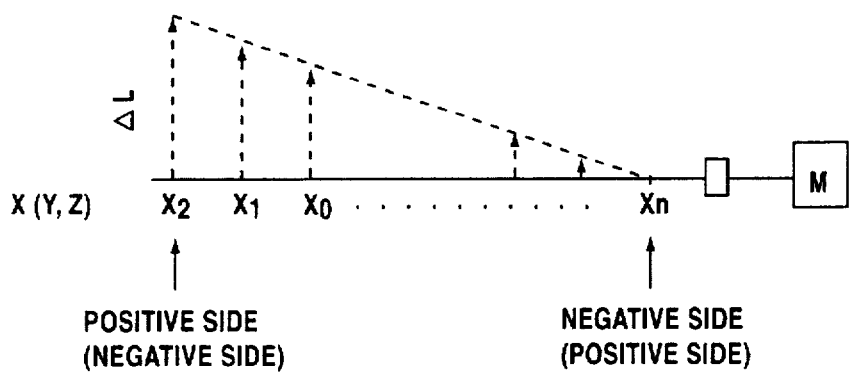
FIG. 5 is a view showing a method for sharing and adding the estimated values ΔL of thermal displacement in a thermal displacement correcting means of a ball screw.

The estimated value ΔL of thermal displacement quantity, which obtained as described above, is uniformly assigned and added to a pitch error correcting quantity registered in a memory type pitch error correcting feature of NC equipment. Concretely, as shown in FIG. 4 and FIG. 5, correcting areas ($X_0$ to $X_n$, in the case of X axis) to be corrected are established in advance at the pitch error correcting quantity, wherein the total quantity of the estimated value ΔL is given to any one of the negative side or positive side area boundary points $X_0$, $X_n$ of the correcting areas ($X_0$ to $X_n$), and is simultaneously uniformly and linearly assigned to the respective points ($X_0$, $X_1$, $X_2$, ... $X_n$) in the correcting area ($X_0$ to $X_n$) and added to the pitch error correcting quantity at each point. Furthermore, the pitch error correcting quantity is usually registered in advance in the pitch error correcting feature of NC equipment, wherein the above points ($X_0$, $X_1$, $X_2$, ... $X_n$) respectively correspond to the correcting point coordinates of the pitch error correcting feature. The area reference zero point $X_0$ is set to either of the motor side or non-motor side in compliance with the coordinate system of a machine. FIG. 4 shows a case where the area reference zero point $X_0$ is set to the motor side and is set to the positive or negative side of the X coordinate system, and FIG. 5 shows a case where the area reference zero point $X_0$ is set to the non-motor side and is set to the positive or negative side of the X coordinate system.

In the above, the correcting area ($X_0$ to $X_n$) may be the total effective length of a ball screw or may be specified areas in the total effective length. Generally, as regards a ball screw in a machine tool, such an operating state in which the nut always repeats reciprocatory actions over the total effective length of the screw axis seldom occurs. Usually, the nut repeats reciprocatory actions in specified areas. Therefore, strictly speaking, the temperature rise distribution of a ball screw is not uniform over the total effective length. In other words, the thermal displacement distribution is not uniform over the total effective length. There is unevenness in the thermal displacement between specified areas, in which the nut repeats reciprocatory actions, and the other areas. An idea that the correcting areas ($X_0$ to $X_n$) are set over the total effective length is such that the entire ball screw is regarded as a thermally single structure and the estimated value ΔL is uniformly assigned to each point of the total effective length, whereby there is an advantage that a further simplified and speedy correction is possible. Furthermore, practically, since heat transmission occurs from said specified areas to the other areas, it is enough in view of the correcting accuracy. Especially, if the travelling area of the nut is wide relative to the total effective length, a higher correcting accuracy is able to be obtained. On the other hand, an idea that the correcting areas ($X_0$ to $X_n$) are set to specified areas is on the basis of the specified areas being a thermally independent structure, in which the estimated value ΔL is uniformly assigned to the respective points in the specified areas, and there is an advantage that a highly accurate correction is possible. Furthermore, in the latter case, the estimated value ΔL may be the entire quantity of the estimated value ΔL obtained in the above. However, if the quantity ΔL' assigned to the specified areas is calculated from the entire quantity of the estimated value ΔL on the basis of the thermal transmission distribution (which may be obtained by experiments) of ball screw, a higher accuracy will be able to be obtained (The remaining quantity is assigned to the other areas). In this case, a correcting calculation process is independently executed at the specified areas and the other areas, the estimated value ΔL is assigned and added to the pitch error correcting quantities corresponding to the respective areas. Still furthermore, the specified area is not limited to a singularity but may be plural. In this case, an assignment quantity of the estimated value ΔL is calculated for every specified area, and a correcting calculation process is independently executed at each of the specified areas on the basis of said assignment quantity, whereby the estimated value ΔL is assigned and added to the pitch error correcting quantity corresponding to the respective areas. It can be said that these two examples are such that the entire quantity of the estimated value ΔL is non-linearly assigned and added to the pitch error correcting quantity.

In the above correcting calculation, although the initial temperature and ambient temperature are disregarded, a correction by the measurement cycle may be concurrently used when they are taken into consideration. This is because of determining the initial length of a ball screw. When the initial value (initial length of a ball screw) by the measurement cycle is inputted, the correcting value ΔL which was calculated and processed up to that moment is cancelled, and a correction is newly given to the pitch error correcting feature.

Figure 6:
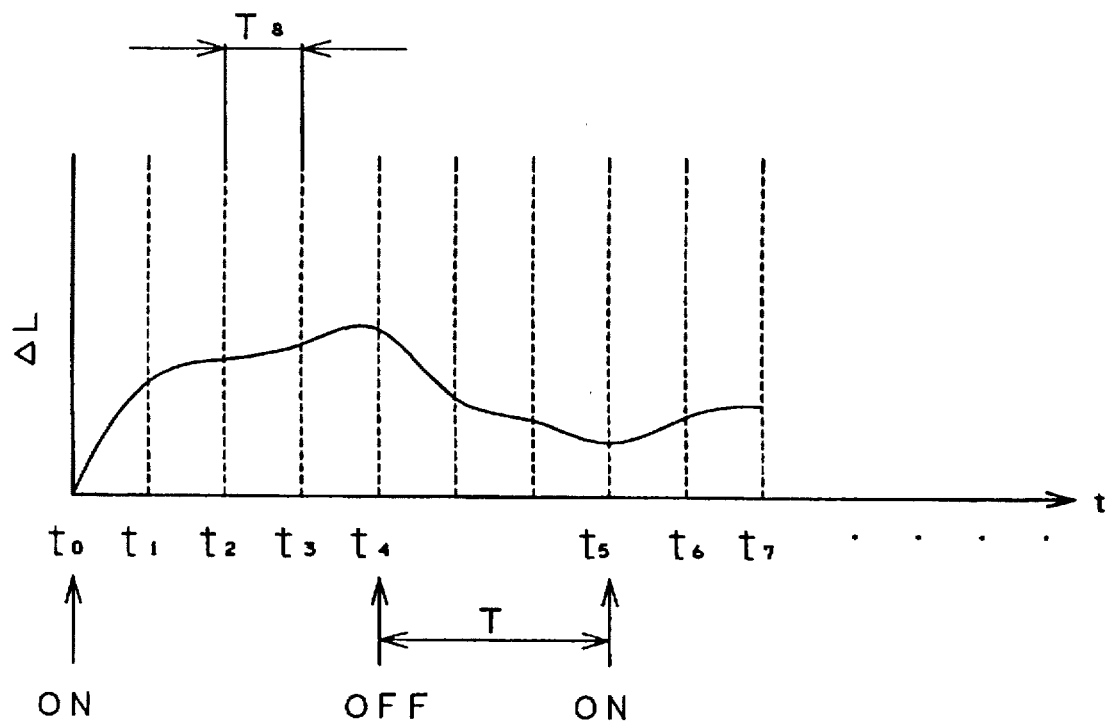
FIG. 6 is a view showing the relationship between the time t1 when a correcting control of pitch error correcting quantity in running a machine (including a hold) is carried out and the estimated values ΔL of thermal displacement quantity.

Furthermore, the following process is carried out when the operation of a machine is interrupted (when the power source is turned on again). Firstly, the machine status on turning on the power source again may be roughly divided into two, one of which is a cold starting, and the other of which is a hot starting. The cold starting is such that the time (power source interrupt time:T) from the last turning off of the power source to the next turning on of the power source exceeds the heat radiation time constant ($\tau_0$) of a ball screw and the machine temperature is acclimated to the ambient temperature, and said hot starting is such that the power source interrupt T is less than the radiation time constant ($\tau_0$) and the machine temperature is not acclimated to the ambient temperature. The temperature rise curve, in said cold starting, of the first order lag after commencement of the correcting calculation is different from that in said hot starting. Therefore, in order to distinguish the cold starting from the hot starting, as shown in FIG. 6, the times t of repeatedly performing a correcting control of the pitch error correcting quantity are stored in memory momentarily, whereby the power source interrupt time T is calculated by comparing the last power interrupt time $t_4$ with this power source turning on time (power source re-turning on time) $t_5$. In the case of cold starting (T>$\tau_0$), the estimated value ΔL is calculated and processed with this power source turning on time $t_5$ made the initial time, and in the case of hot starting (T<$\tau_0$), the estimated value ΔL is calculated and processed with the last power source turning on time to made the initial time again. The initial value of the estimated value ΔL is zero (0) in the case of cold starting and is made a value obtained by calculating the value of ΔL at the last power source interrupt time $t_1$, the power source interrupt time T and the heat radiation time constant $\tau_0$ in the case of hot starting.

Figure 7:
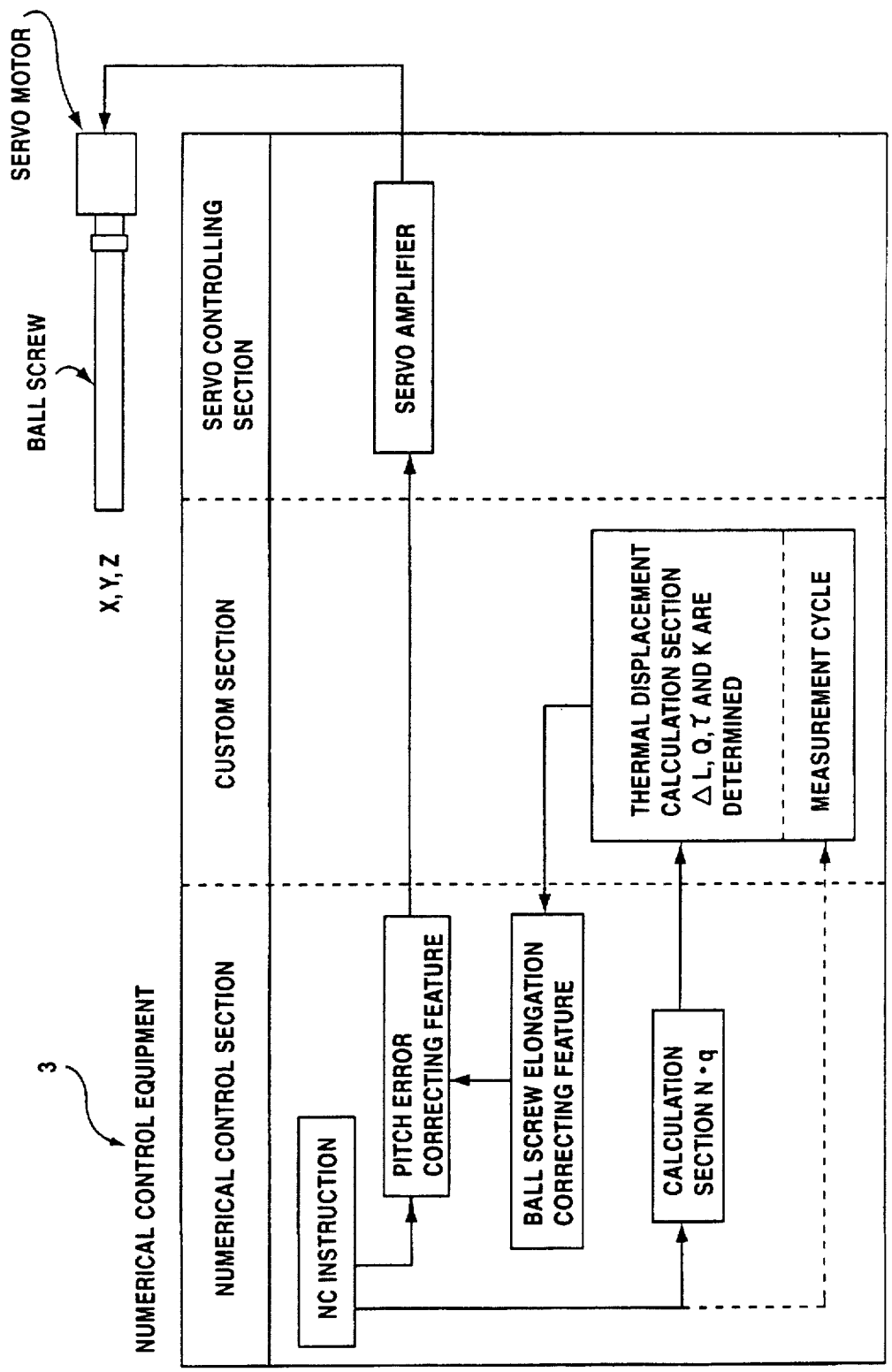
FIG. 7 is a view showing the features of NC equipment regarding a ball screw thermal displacement correcting means.

FIG. 7 conceptionally shows the functions pertaining to the thermal displacement correcting means of NC equipment 3. The thermal displacement calculation section incorporated in the custom portion of NC equipment 3 receives the values of N·q calculated and processed in the calculation section of NC equipment and calculates and processes the ball screw thermal displacement quantity ΔL in compliance with the abovementioned patterns. The estimated value ΔL of thermal displacement calculated and processed at the thermal displacement calculation section is inputted in the pitch error correcting feature of NC equipment via a ball screw elongation correcting feature, and is assigned and added to each point of the pitch error correcting quantities registered in the pitch error correcting feature. These corrected pitch error correcting quantities are outputted to a servo amplifier of a servo control section from the pitch error correcting feature, wherein the rotation control of the ball screw is carried out by the servo amplifier. In a case where a measurement cycle is concurrently used, a measurement program is incorporated in the custom section, whereby the initial length of the ball screw is measured by the measurement cycle and is outputted to the thermal displacement calculation section.

Furthermore, this NC equipment 3 is provided with the following specifications:

(1) Forced Resetting are VALID/INVALID Change Features

It is possible to perform a forced resetting and VALID/INVALID change by settings on an NC display.

i. Forced resetting

The initial time and calculated values, etc. are cleared and initialized. And calculations are performed from the moment to commence a correcting.

ii. VALID/INVALID change

It is possible to carry out a change for whether a correcting by the estimated value ΔL is made valid or invalid.

(2) Display Feature of Parameters and Calculation Results i. Parameters

Time constant τ: $\tau_H$, $\tau_M$, $\tau_L$ (seconds)

Control unit time : Ts (seconds)

Sampling unit time : ΔTs (seconds)

Coefficient: K

Thresholds of the number of motor revolutions: H, M, L (r.p.m.)

Ball screw entire length: L (mm)

Maximum value of the estimated value ΔL : ΔLmax (mm)

Forced reset, VALID/INVALID, etc.

ii. Calculation results

Initial time

Estimated value ΔL

Pitch error correcting quantity after correction

Number N of motor revolutions

Action/time ratio : q (3) Data Peripheral Output

After-correction pitch error correcting quantity is able to be outputted to the peripheries.

Since the ball screw thermal displacement correcting means described above estimates the ball screw thermal displacement quantity by utilizing the first order lag expression from the number of motor revolutions and action/time ratio, there is no need to use any special hardware when calculating the thermal displacement quantity, and it is possible to carry out a thermal displacement correction by a simplified and quick calculation process. Furthermore, correcting areas are established, in which some corrections are able to be added to the pitch error correcting quantities, and the estimated values of thermal displacement quantities are given to either of the negative side or positive side area boundary point of the correcting area, whereby they are linearly and uniformly assigned and added to each point in the above correcting area, and the calculation process for correcting the thermal displacement is simplified and accelerated.

In a case where the above estimated value is obtained by the first order lag expression, since the time constant τ in the first order lag expression is obtained by dividing a curve which expresses the relationship between the number of revolutions obtained by the ball screw temperature rise curve and the time constant into a plurality of areas of the number of revolutions and linearly approximating said curve at every area of the number of revolutions, it is possible to obtain the estimated values at a comparatively high accuracy without any complicated analysis and calculations.

In a case where the machine operation is interrupted, the calculation process is carried out by comparing the power source interrupt time from the last power source interrupt time to this power source turning-on time with the heat radiation constant obtained from the ball screw radiation curve and distinguishing the cold starting and hot starting, whereby the correcting accuracy is able to be improved.

In a case where influences due to the initial temperature and ambient temperature are taken into consideration, the calculation process of the above estimated values is carried out on the basis of the ball screw initial length measured by the measurement cycle, whereby the correction accuracy is able to be further improved.

Figures 8, 9, 10:
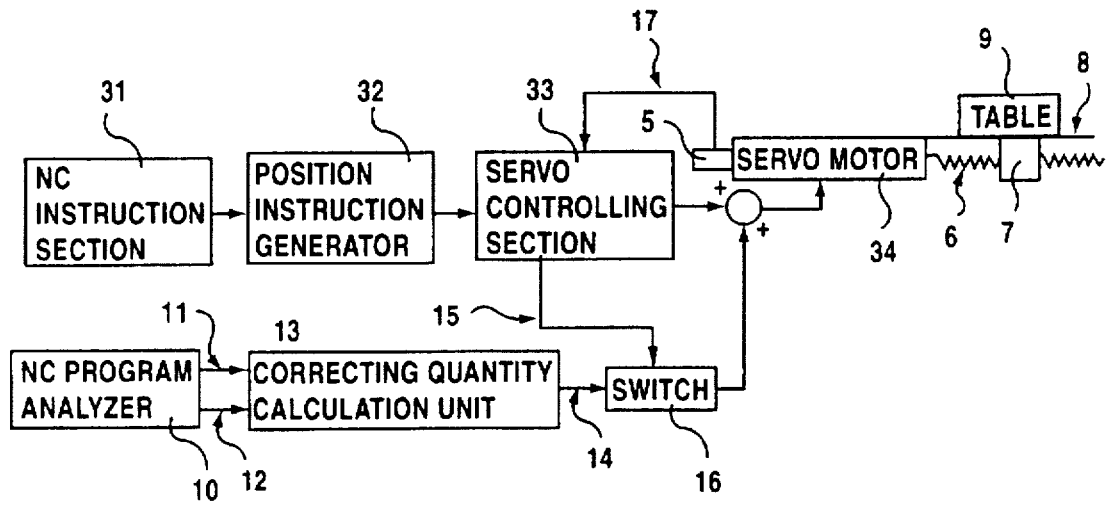
FIG. 8 is a linear block diagram showing a first preferred embodiment of a lost motion correcting means.
FIG. 9 is a conversion table A for obtaining the lost motion correcting quantity corresponding to the feedrates and travelling distances in the lost motion correcting means.
FIG. 10 is a conversion table B for obtaining the lost motion correcting quantity corresponding to the feedrates, travelling distances and positions in the travelling area in the lost motion correcting means.

Next, a description is given of a lost motion correcting means. FIG. 8 is a linear block diagram showing a first preferred embodiment of the lost motion correcting means, wherein a reference number 31 is an NC instruction section of NC equipment 3, 32 is a position instruction generating unit which assigns pulses, 33 is a servo controller for driving a table 9, 34 is a servo motor, 5 is a position detector connected to the servo motor 34, 6 is a feed screw of a ball screw, 7 is a nut of the ball screw, 8 is a guideway, 9 is a table, 10 is an NC program analyzer, 11 is a signal corresponding to a feedrate F, 12 is a signal corresponding to a travelling distance L, 13 is a correcting quantity calculation unit, 14 is a correcting signal, 15 is a control signal which is outputted when the rotation direction of the servo motor 34 is reversed, and 16 is a switch which is used for changing whether or not the correcting signal 14 is overlapped onto the instruction value to the servo motor 34.

The NC instruction section 31 reads an inputted NC program and assigns pulses to the position instruction generating unit 32, whereby a travelling instruction is sent to the servo controller 33. The servo controller 33 drives the servo motor 34 according to the travelling instruction, wherein the position and speed are controlled to become the instruction values by a feedback signal 17 coming from the position detector 5 connected to the servo motor 34. The servo motor 34 is generally connected in series with the feed screw 6, and the rotating movement of the servo motor 34 is converted to a linear motion of the table 9 along the guideway 8 via a nut 7.

On the other hand, the NC program analyzer 10 receives an NC program from the NC instruction section 31 and analyzes the feedrate and travelling distance of each feed drive axis. The NC program analyzer 10 is exclusively used for extracting information regarding the feedrate and travelling distance while the NC instruction section 31 undergoes analysis of not only the feedrate and travelling distance but also various kinds of data in the analysis of programs. Therefore, even though both of them commence analysis simultaneously, there is a sufficient allowance in time until the feed orientation is actually reversed. As a result of such analysis, a signal 11 corresponding to the feedrate F and a signal 12 corresponding to the travelling distance L are inputted into the correcting quantity calculation unit.

The correcting quantity calculation unit 13 carries out, for example, the following calculations. That is, as shown in FIG. 9, a conversion table A consisting of "m" lines and "n" rows, in which the range of the travelling distance of each axis is divided into "m" lines, and the range of the feedrate is divided into "n" rows, is stored in a memory unit of the correcting quantity calculation unit 13, whereby lost motion quantities pertaining to the travelling distances L1 to Lm and feedrates F1 to Fn are obtained in advance by measurements, and the absolute values of these lost motion quantities are established in said conversion table A as correcting quantities H11 to Hmn. Subsequently, a correcting quantity H corresponding to the feedrate F and travelling distance L is automatically read from this conversion table A when carrying out a machining by an NC program and is obtained as a correcting signal 14.

Figure 11:
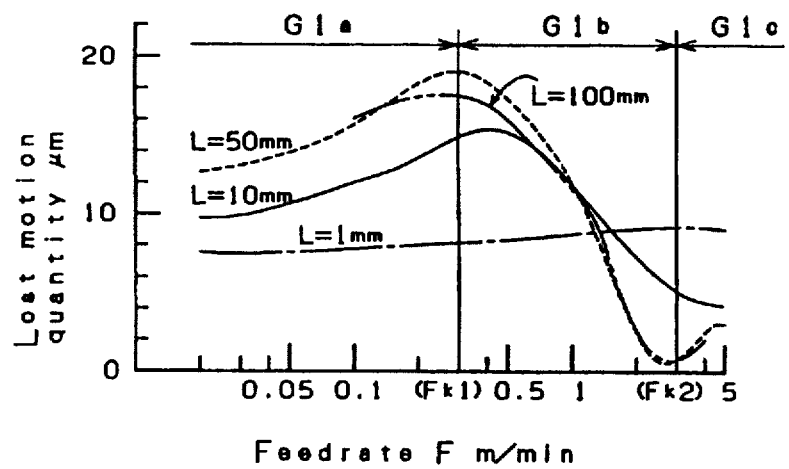
FIG. 11 is a view showing the results of measurement of the lost motion quantities relative to feedrates.
Figure 12:
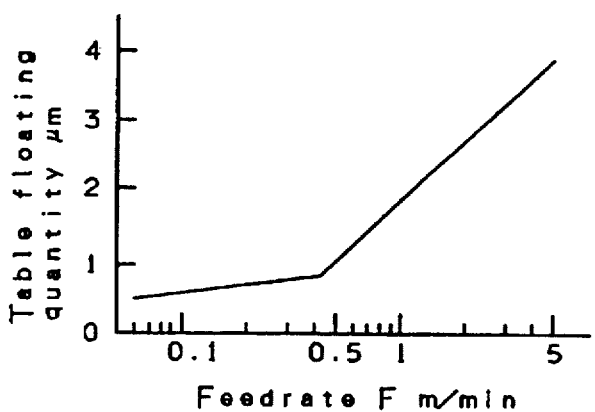
FIG. 12 is a view showing the table floating quantity relative to the feedrates.
Figure 13:
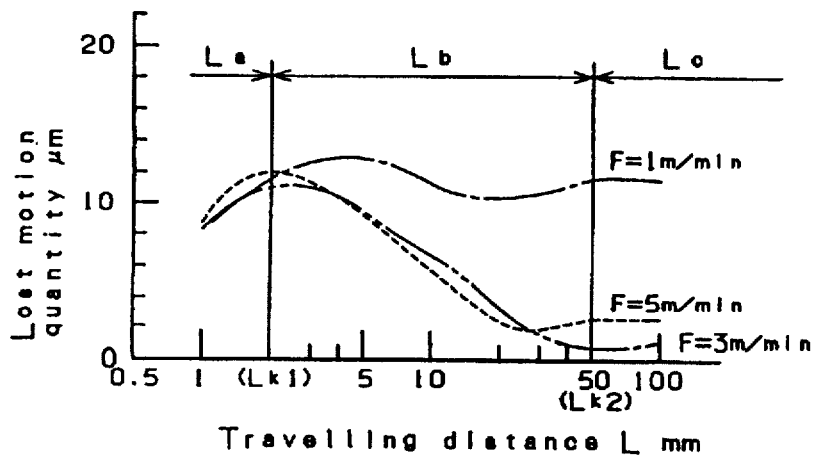
FIG. 13 is a view showing the results of measurement of lost motion quantities relative to travelling distances.

Furthermore, it is possible to easily obtain a correcting quantity H, utilizing a conversion table B, shown in FIG. 10, instead of the conversion table A. The conversion table B is prepared on the basis of, for example, the following reference. FIG. 11 shows the results of actual measurements of the lost motions relative to the feedrate F, using an NC machine tool. In a case where the travelling distance L is 1 mm, the lost motion quantity is hardly influenced by the feedrate F but is almost a fixed value. On the other hand, in a case where the travelling distance L is 10, 50, or 100 mm, the lost motion quantity is gradually increased when the feedrate F is less than Fk1 (around F=0.3 m per minute in FIG. 11), the lost motion quantity is radically decreased when the feedrate F is between Fk1 and Fk2 (around F=3 m per minute in FIG. 11), and a change of the lost motion quantity is made small if the feedrate F becomes larger than Fk2. It is found from the result of measurements shown in FIG. 12 that one of the causes of such a change of the lost motion quantity is a floating of the table 9 due to travelling. FIG. 12 shows measurements of the relationship between the feedrate F and floating quantities of table 9. When the table 9 moves on the slide guideway 8, a kinetic pressure is generated due to an oil film existing on the slide guideway 8 to cause the table 9 to be floated several μm or so, whereby it is considered that the lost motion quantity is changed since the friction force is lightened. In FIG. 12, the floating quantity of the table 9 is radically increased when the feedrate F is around 0.4 m per minute, and this corresponds to a radical decrease of the lost motion quantity in FIG. 11. The energy by which the table 9 is floated is determined by a function of the feedrate F and travelling distance L. For example, the energy given when the travelling distance is short even though the feedrate F is large will be small, the table 9 will not be floated, thereby causing the lost motion quantity to be large. FIG. 13 shows the result of measurements of lost motion quantities when changing the travelling distance L. The lost motion quantity is increased when the travelling distance L is less than Lk1 (around L=2 mm in FIG. 13) and is decreased when the travelling distance L is between Lk1 and Lk2 (around L=50 mm in FIG. 13). A change of the lost motion quantity is decreased when the travelling distance L is made larger than Lk2. Therefore, in order to simply obtain a correcting quantity H, the area of feedrate F is, as shown in FIG. 11, divided into four areas, that is, an area G1a from the fine feedrate to Fk1, an area G1b from Fk1 to Fk2, an area G1c from Fk2 to the maximum feedrate, and a quick feedrate (not illustrated). Next, the area of travelling distance L is, as shown in FIG. 13, divided into three areas, that is, an area La from the micro travelling distance to Lk1, an area Lb from Lk1 to Lk2, and an area Lc of more than Lk2. Furthermore, although not illustrated, it is known that the lost motion quantity may generally change more or less according to the position of each feed drive axis in the travelling range thereof. For convenience, the position in this travelling area is divided into four equal areas, P1, P2, P3 and P4. The conversion table B is prepared by combining the feedrates F, travelling distances L and positions P in the travelling range, which are divided as shown above. The conversion table B which has been prepared as shown above is stored in a memory device in the correcting quantity calculation section 13, the lost motion quantity of the respective areas is measured in advance by experiments, and the average values of the absolute values of the lost motion quantities thus measured are established in the conversion table B as lost motion correcting quantities. Furthermore, as a result of the measurement of lost motion quantities in area G1b of the feedrate F shown in FIG. 11, if the influence due to the travelling distance L is small, there is no problem in practical use even though an area of the travelling distance L corresponding to area G1b. In a case where the conversion table B is used, since the feedrate F, travelling distance L and positions in the travelling range are taken into consideration as factors for causing the lost motion quantities to be changed, the NC program analyzer 10 also analyzes the positions in the travelling range and inputs the results into the correcting quantity calculation section 13. And as in a case where the conversion table A is used, when carrying out a machining work by NC programs, the lost motion quantities H corresponding to the feedrate F, travelling distance L and positions in the travelling range are automatically read from the conversion table B, whereby it is possible to simply obtain a correcting signal 14.

Figure 14:
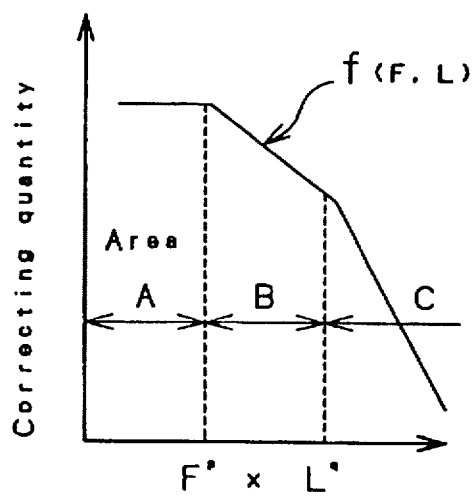
FIG. 14 is a view shown with broken lines, in which the lost motion correcting quantities corresponding to the travelling distance and feedrate are approximated.

Since a lost motion quantity may be changed by a feedrate F and a travelling distance L, it is possible to obtain a correcting value H a function f (F,L) in which F and La are made variables. That is, a function f (F,L) is established in advance by measurements, and approximated with broken lines as shown in FIG. 14, whereby it is possible to obtain correcting quantities by dividing the area into some parts.

The lost motion correcting quantity H is internally calculated in the correcting quantity calculation section 13 periodically or whenever a signal 11 corresponding to the feedrate F or a signal 12 corresponding to the travelling distance L is changed, and the result thereof is outputted as a correcting signal 14. However, the moment that the calculated correcting signal 14 is actually overlapped onto the instruction value from a servo controller 3 to a servo motor 34 is the moment when the feed orientation of table 9 is reversed, that is, when the revolution direction of the servo motor 34 is reversed. That is, in FIG. 8, it is always monitored by the servo controller 33 whether or not a label of a feedback signal 17 which is sent from a position detector 5 connected to the servo motor 34 to the servo controller 33 is reversed. When the label is reversed, a control signal 15 is outputted from the servo controller 33 to a switch 16, whereby the switch 16 is closed and the correcting signal 14 is overlapped onto the instruction value to the servo motor 34. It is decided by the NC program analyzer 10 that the label of the correcting signal 14 becomes negative when the orientation of the feed drive axis is reversed from positive to negative, and in the reverse case, the same becomes positive.

Figure 15:
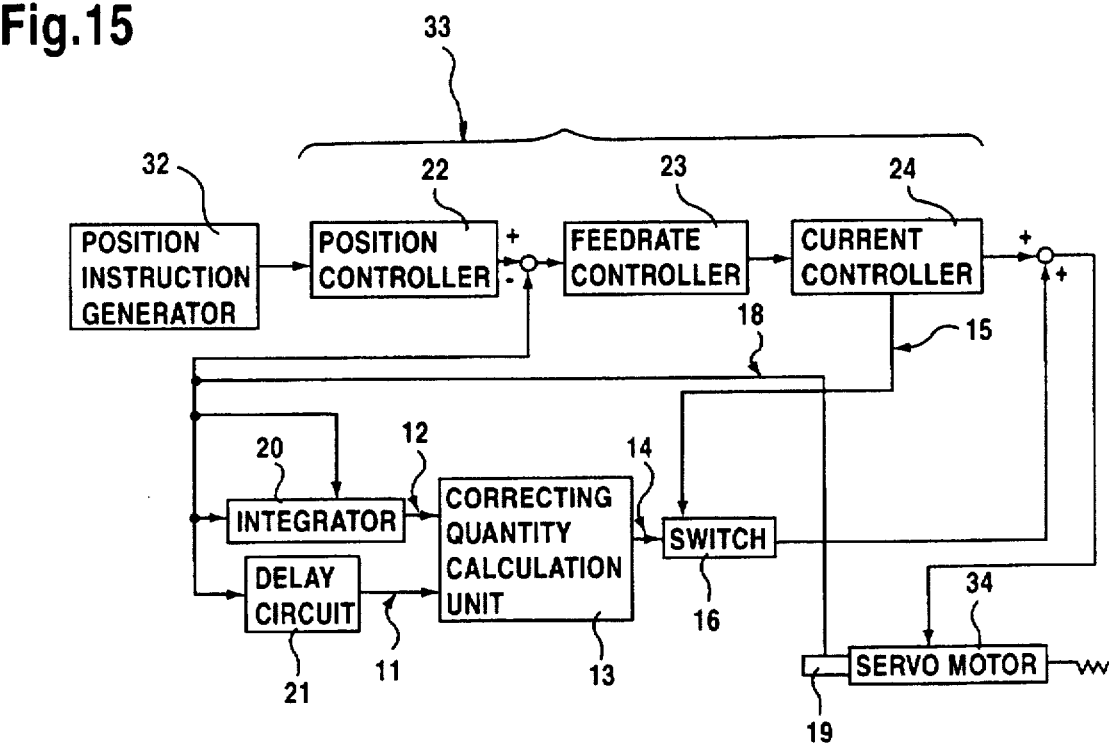
FIG. 15 is a linear block diagram showing a second preferred embodiment of a lost motion correcting means.

FIG. 15 is a linear block diagram showing a second preferred embodiment of the lost motion correcting means, wherein instead of the feedrate and travelling distance before the feed orientation of each feed drive axis obtained by analyzing the NC program, said feedrate and travelling distance is obtained by utilizing a feedrate feedback signal 18 sent from a feedrate detector 19 connected to the servo motor 34 to the servo controller 33. In FIG. 15, 19 is a feedrate detector, 20 is a integrator, and 21 is a delay circuit. The servo controller 33 consists of a position controller 22, a feedrate controller 23 and a current controller 24.

In FIG. 15, the feedrate feedback signal 18 taken in the integrator 20 is integrated and is converted to a signal showing a travelling distance. When the feedrate feedback signal 18 which is taken in through a separately installed input port becomes zero, that is, when the feed orientation of table 9 is reversed or stopped, the memory content of the integrator 20 is internally deleted, and a signal showing the integrated travelling distance is handled as a signal 12 corresponding to the travelling distance L before the feed orientation is reversed. Since a signal outputted from the integrator 20 usually produces an inherent time lag, a feedrate feedback signal 18 is taken in the delay circuit 21. After the signal is synchronized with a signal 12 corresponding to the travelling distance L, the signal outputted from this delay circuit 21 is handled as a signal 11 corresponding to the feedrate F. Next, if a signal 12 corresponding to the travelling distance L and a signal 11 corresponding to the feedrate F are inputted in the correcting quantity calculation unit 13, a correcting signal 14 corresponding to the lost motion correcting quantity H is calculated as in the first preferred embodiment. Since the signal 11 corresponding to the feedrate F passes through the delay circuit 21, the same is not influenced by any speed acceleration or deceleration, and any lower feedrate than the constant speed will not be taken in the correcting quantity calculation unit 13. Although the current controller 24 outputs a current instruction value to the servo motor 34, simultaneously a control signal 15 is outputted from another output port. When the rotation direction of the servo motor 34 is reversed, that is, when the control signal 15 is outputted, the switch 16 is closed, thereby causing a correcting signal 14 to be overlapped onto the instruction value to the servo motor 34. In this case, the label of the correcting signal 14 is determined by a backlash correcting feature which the NC instruction section 31 has.

Figure 16:
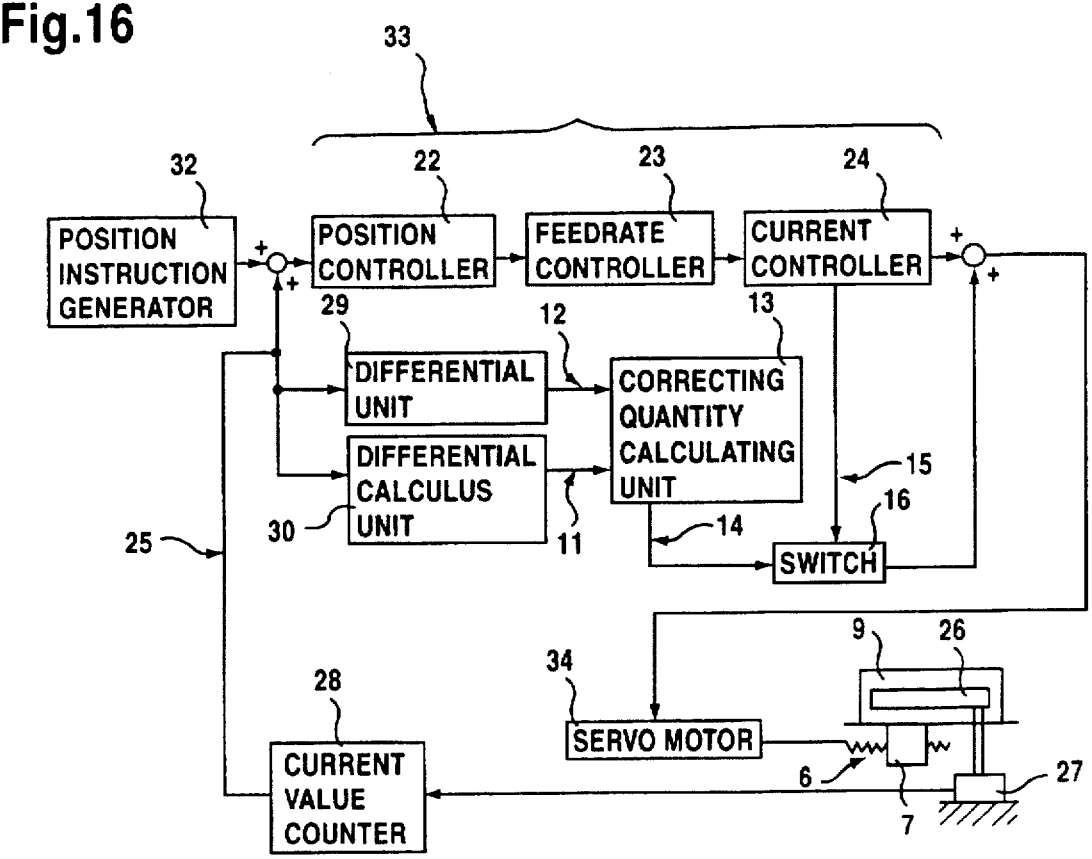
FIG. 16 is a linear block diagram showing a third preferred embodiment of lost motion correcting means.

FIG. 16 is a linear block diagram showing a third preferred embodiment of the lost motion correcting means, wherein instead of the feedrate and travelling distance before the feed orientation of each feed drive axis obtained by analyzing the NC program, said feedrate and travelling distance are obtained by utilizing a position feedback signal 25. In FIG. 16, a reference number 26 is a linear scale attached top the table 9, 27 is a linear scale detector which is attached to the fixing section. 28 is a current value counter, 29 is a differential unit, and 30 is a differential calculus unit, wherein a correcting quantity calculation unit 13, switch 16 and servo controller 33 are identical to those in the second preferred embodiment.

In FIG. 16, the output of the linear scale detector 27 is inputted in the current value counter 28 and is converted to position feedback signals 25 therein. The differential unit 29 analyzes the position feedback signals 25 taken in, and the signals 25 are internally reset when the feed orientation of the table 9 is reversed or the table 9 is stopped, whereby the position feedback signals 25 thereafter taken in the differential unit 29 are made so as to be able to be handled as a signal 12 corresponding to the travelling distance L before the feed orientation is reversed. The position feedback signals 25 are also taken in the differential calculus unit 30 and are differentiated and converted to signals showing a feedrate, whereby the same are handled as signals 11 corresponding to the feedrate F. The position feedback signals 25 have a time lag corresponding to a droop quantity by an integration effect which has the current value counter 28 has. Therefore, a delay circuit 21 in the second preferred embodiment is not required herein. Next, if a signal 12 corresponding to the travelling distance L and a signal 11 corresponding to the feedrate F are inputted in the correcting quantity calculation unit 13, a correcting signal 14 is calculated as in the second preferred embodiment. Also as in the second embodiment, the switch 16 is closed when the rotation direction of the servo motor 34 is reversed, the correcting signal 14 is overlapped onto the instruction value to the servo motor 34.

In the third preferred embodiment of the lost motion correcting means, signals outputted from the linear scale 26, linear scale detector 27 and current value counter 28 are used as position feedback signals 25. However, a position detector usually used in a semi-closed control, for example, a rotary encoder, is connected to the servo motor 34, and position feedback signals which are issued by this position detector may be used.

A description is given of a pattern for correcting the lost motion when a linear positioning action is instructed for the XY plane, based on the second preferred embodiment of the lost motion correcting means. Furthermore, the following description is also applicable to the third preferred embodiment of the lost motion correcting means.

Figure 17:
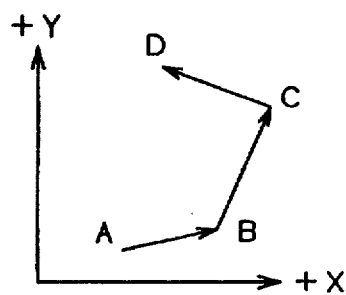
FIG. 17 is a view showing the travelling loci of the spindle center in an NC machine tool.
Figure 18:
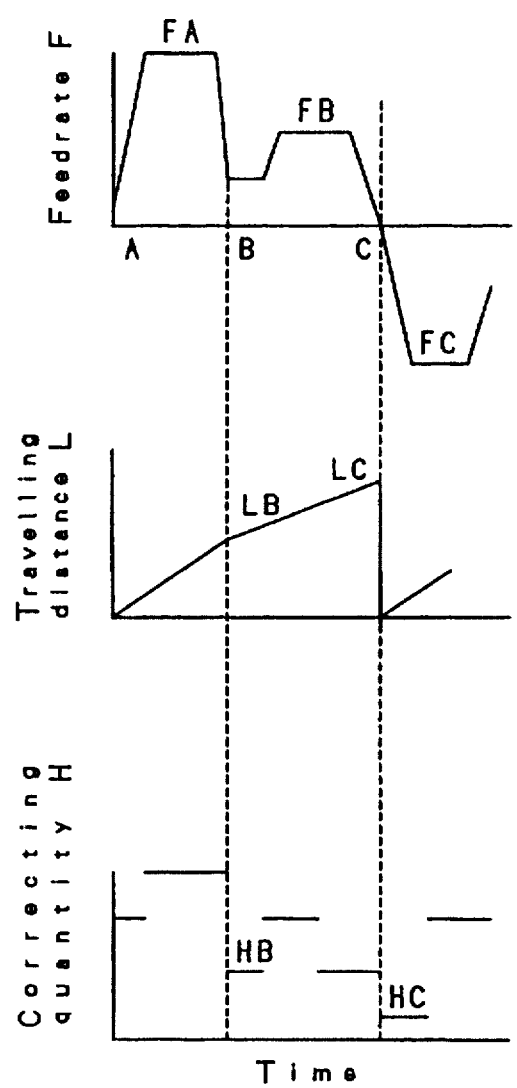
FIG. 18 is a time chart showing feedrates, travelling distances and lost motion quantities.

FIG. 17 shows the travelling loci A, B, C and D of the spindle center of an NC machine tool, wherein in order to simplify the explanation, it is assumed that the speed instructed by an NC program on the XY plane from A to D is fixed. As been made clear in FIG. 17, in travelling from A to B and B to C, the feed orientations in X and Y axes are both positive. However, in travelling from C to D, the X axis feed orientation is reversed from positive to negative while the Y axis feed orientation remains unchanged (that is, positive). FIG. 18 is a time chart showing the feedrates F, travelling distance L and lost motion correcting quantity H from the correcting quantity calculation unit 13. For the description, it is assumed that the constituents of feedrate in the X axis direction are FA from point A to point B, FB from point B to point C, FC from point C to point D and the constituents of the travelling distance in the X axis direction between A and B and between B and C are respectively LB and LC.

When travelling from point A to point B, a signal 12 corresponding to the travelling distance L, which is obtained by integrating the feedrate feedback signal 18 taken in the integrator 20, is increased in line with elapse of time. A signal 11 corresponding to the feedrate F, which is outputted from the delay circuit 21, is delayed by time Ts. If these signals 11 and 12 are inputted in the correcting quantity calculation unit 13, a correcting signal 14 corresponding to the lost motion correcting quantity H is outputted once every fixed duration of time. Data of the feedrate FA and travelling distance LB are used at point B, and a correcting signal 14 corresponding to the correcting quantity HB is outputted to the switch 16 from the correcting quantity calculation unit 13.

The feedrate in the X axis direction changes around point B. However, the feed orientation remains unchanged (that is, positive). That is, since the rotation direction is not changed although the rotation speed of the servo motor 34 is changed, no control signal 15 is outputted from the current controller 24 to cause the switch 16 to remain open. Therefore, the correcting signal 14 is not overlapped onto the instruction value to the servo motor 34, wherein no correcting is carried out. Furthermore, since the table 9 does not substantially stop at point B, the data of travelling distance are accumulated without deleting the memory content of the integrator 20.

Data of the feedrate FB and travelling distance LC are used at point C, and a correcting signal 14 corresponding to the correcting quantity HC is outputted from the correcting quantity calculation unit 13 to the switch 16.

The feed orientation in the X axis direction is changed from positive to negative around point AC. That is, since the rotation direction of the servo motor 34 is changed, a controlling signal 15 is outputted from the current controller 24 to cause the switch to be closed. Therefore, the correcting signal 14 is overlapped onto the instruction value to the servo motor 34, whereby the lost motion correction is carried out. At this time, the memory content of the integrator 20 is internally deleted, whereby measurement of the travelling distance from point C to point D is prepared. Furthermore, in the first preferred embodiment, only the point that data of the travelling distance and feedrates are obtained by analyzing the NC programs is different from the second preferred embodiment. They are identical to each other in that a correcting quantity is calculated from the travelling distance and feedrates, and the correcting quantity is overlapped onto the instruction value to the servo motor 34.

Although the above description explains correction of the lost motion of one axis, it is possible to simultaneously correct the lost motions in multi-axis control such as simultaneous two-axis or simultaneous 3-axis by using the first, second and third preferred embodiments.

According to the lost motion means described above, the correction of lost motions which may be produced when the feed orientation is reversed is able to be automatically and adequately carried out. Therefore, overcutting or undercutting due to lost motions produced in changeover of the quadrants is able to be lowered, thereby causing the shape accuracy to be improved. Still furthermore, since the elastic deformation is also taken into consideration in the correcting quantity, an adequate correction is able to be achieved even in an NC machine tool having a low rigidity at the feed drive system thereof.

Figure 19:
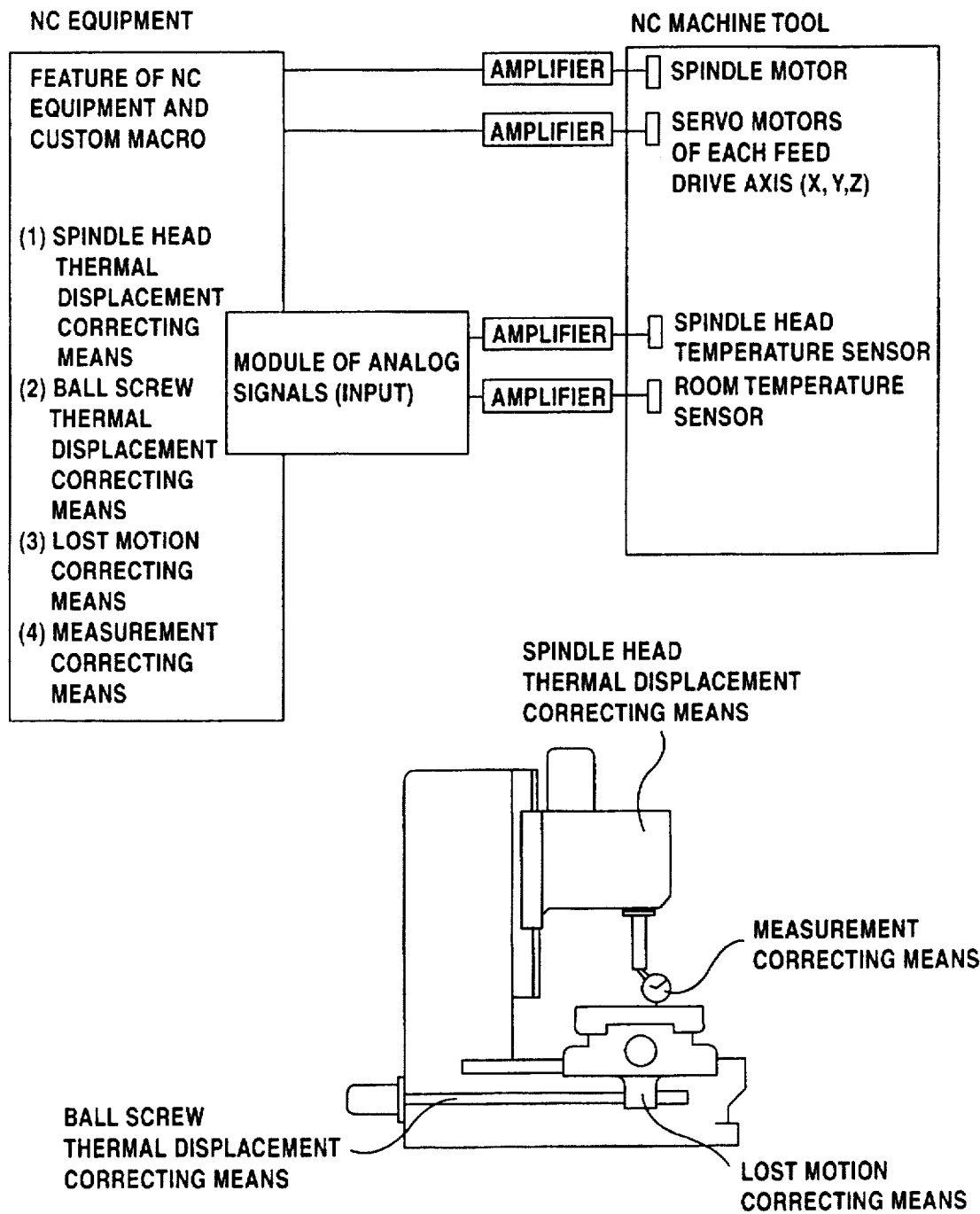
FIG. 19 is a view showing NC equipment which is provided with a spindle head thermal displacement correcting means, a ball screw thermal displacement correcting means, a lost motion correcting means, and a measurement correcting means.

A spindle head thermal displacement correcting means, ball screw thermal displacement correcting means and lost motion correcting means, which are described above, are able to be independently adopted. Furthermore, as shown in FIG. 19, if these three means and a measurement correcting means (that is, a means for newly starting control with the measured value used as an initial value, concurrently using a measurement cycle such as a touch sensor described above) are employed in an NC machine tool, the synthetic dynamic errors of an NC machine tool are able to be interpolated, whereby it is possible to construct a dynamic error correcting system which is able to maintain a high machining accuracy.

What is claimed is:

1. A dynamic error correcting system for a numerically controlled machine tool having a spindle head and a drive section with at least one ball screw, said system comprising:

spindle head thermal displacement correcting means for carrying out a correction of a reference zero position of the spindle head, wherein the spindle head thermal displacement correcting means uses the room temperature, spindle head temperature and number of spindle revolutions as factor values to determine a thermal displacement correction quantity in accordance with a predetermined relationship between the factor values and the spindle head thermal displacement, and wherein the spindle head thermal displacement correcting means comprises:
  displacement calculating means for periodically calculating and estimating a thermal displacement quantity, when carrying out a machining action based upon instructions from numerical control programs of numerical control equipment, from the factor values by using the predetermined relationship;
  displacement correcting quantity calculating means for receiving the calculated thermal displacement quantity from the displacement calculating means and periodically calculating a thermal displacement correcting quantity by using a first order lag expression; and
  coordinate system correcting means for the numerical control equipment for receiving the calculated thermal displacement correction quantity from the displacement correcting quantity calculating means and correcting the reference zero; said dynamic error correcting system further comprising ball screw thermal displacement correcting means for correcting a pitch error correcting quantity, wherein the ball screw thermal displacement correcting means comprises:
  heat generation calculating means for calculating a heat generation quantity (Q) of the ball screw from a number (N) of motor revolutions per a sampling unit time ($\Delta Ts$) during a control unit time (Ts) and a ratio (q) of a time during which the motor is rotating to the control unit time (Ts);
  estimate calculating means for receiving the heat generation quantity (Q) from the heat generation calculating means and calculating an estimated value ($\Delta L$) of the thermal displacement of the ball screw;
  establishing means for establishing a correcting area having a negative and positive side area boundary in which a correction is added to the pitch error correcting quantity of a memory type pitch error correcting feature of the numerical control equipment, such that the estimated value ($\Delta L$) from the estimate calculating means is added to one of the negative side and positive side area boundary points of the correcting area established by the establishing means, and simultaneously the estimated value ($\Delta L$) is linearly and uniformly assigned and added to each point in the correcting area, thereby causing said pitch error correcting quantity to be corrected; said dynamic error correcting system further comprising lost motion correcting means for correcting for lost motion when a feed orientation of a feed drive axis is reversed, wherein the lost motion correcting means comprises:
  relationship obtaining means for obtaining a predetermined relationship between a feed rate and a travelling distance of the feed drive axis and a lost motion quantity;
  value obtaining means for obtaining the feed rate and the travelling distance before the feed orientation of the feed drive axis is reversed when performing a machining action on the basis of instructions of the numerical control programs;

lost motion calculating means for receiving the feed rate and travelling distance before the feed orientation of the feed drive axis is reversed from the value obtaining means and calculating a lost motion correcting quantity using the predetermined relationship obtained from the relationship obtaining means; and overlapping means for overlapping the lost motion correcting quantity received from the lost motion calculating means onto the instruction values of a servo motor which drives the feed drive axis at the time when the feed orientation of the feed drive axis is reversed, thereby correcting for lost motion.

2. A spindle head thermal displacement correcting method for a numerically controlled machine tool, the method comprising the steps of:

obtaining a predetermined relationship between factor values and spindle head thermal displacement wherein room temperature, spindle head temperature and number of spindle revolutions are selected as the factor values pertaining to said spindle head thermal displacement;

periodically calculating an estimated spindle head thermal displacement quantity when carrying out a machining action on the basis of instructions of numerical control programs of numerical control equipment from the factor values using the predetermined relationship obtained;

periodically calculating a thermal displacement correcting quantity from the estimated thermal displacement quantity by using a first order lag expression; and performing a reference zero correction by providing the thermal displacement correcting quantity to a coordinate system correcting feature of the numerical control equipment.

3. A spindle head thermal displacement correcting method for a numerically controlled machine tool as set forth in claim 2, further comprising the steps of:

providing a sensing means for sensing thermal displacement;

performing a measurement cycle with the sensing means to obtain a measured value of a thermal displacement quantity;

interrupting the step of performing the reference zero correction when performing the measurement cycle;

subtracting the calculated value of the thermal displacement correcting quantity immediately before performing the measurement cycle from the measured value of the thermal displacement quantity to obtain a corrected thermal displacement correcting quantity;

providing the corrected thermal displacement correcting quantity to the coordinate system correcting feature of the numerical control equipment; and correcting the coordinate system, thereby correcting spindle head thermal displacement.

4. A ball screw thermal displacement correcting method for a numerically controlled machine tool, the method comprising the steps of:

obtaining a heat generation quantity (Q) of a ball screw from a number (N) of motor revolutions of a motor per sampling unit time ($\Delta Ts$) at a control unit time (Ts), and a ratio (q) of a time during which the motor is rotating to the control unit time (Ts);

obtaining an estimated value ($\Delta L$) of a ball screw thermal displacement quantity from the heat generation quantity (Q);

establishing a correcting area in which a correction value is added to a pitch error correcting quantity of a memory type pitch error correcting feature of numerical control equipment; and correcting the pitch error correcting quantity by providing the estimated value ($\Delta L$) to one of a negative side and a positive side area boundary point of the correcting area, and simultaneously linearly and uniformly assigning and adding the estimated value ($\Delta L$) to each point in the correcting area.

5. A ball screw thermal displacement correcting method in a numerically controlled machine tool as set forth in claim 4, wherein a curve expressing a relationship between a number of revolutions of the ball screw and a time constant (T) is divided into a plurality of number-of-revolution areas, and the time constant (T) is obtained by linearly approximating the curve in every number-of-revolution area, and the estimated value ($\Delta L$) is obtained from a first order lag expression by using the time constant (T).

6. A ball screw thermal displacement correcting method in a numerically controlled machine tool as set forth in claims 4 or 5, further comprising the steps of:

periodically storing in memory a time corresponding to a time of correcting of the pitch error correcting quantity;

comparing a time (T) corresponding to a time elapsed between a preceding power source interrupt time and a current power source turn-on time with a heat radiation time constant ($T_\theta$) obtained from a heat radiation curve of the ball screw;

using the current power source turn-on time as an initial time for calculating the estimated value ($\Delta L$) when $T > T_\theta$; and using the preceding power source interrupt time as an initial time for calculating the estimated value ($\Delta L$) when $T < T_\theta$.

7. A ball screw thermal displacement correcting method in a numerically controlled machine tool as set forth in claims 4 or 5, further comprising the steps of:

providing a sensing means for sensing a length of the ball screw;

performing a measurement cycle with the sensing means to obtain the length of the ball screw;

cancelling the estimated value ($\Delta L$) used before the measurement cycle is performed; and using the length of the ball screw measured by the measurement cycle as an initial length (L) of the ball screw for calculating the estimated value ($\Delta L$).

8. A lost motion correcting method in a numerically controlled machine tool, comprising the steps of:

obtaining a predetermined relationship between a feed rate and a travelling distance of a feed drive axis and a lost motion quantity;

obtaining a feed rate and a travelling distance before a feed orientation of the feed drive axis is reversed when performing a machining action based on instructions of numerical control programs of numerical control equipment;

calculating a lost motion correcting quantity corresponding to the feed rate and travelling distance before the feed orientation of the feed drive axis is reversed using the predetermined relationship; and correcting for lost motion by overlapping the lost motion correcting quantity obtained by the calculation onto an instruction value for a servo motor which drives the feed drive axis.

9. A lost motion correcting method in a numerically controlled machine tool as set forth in claim 8, wherein the feed rate and the travelling distance before the feed orientation of the feed drive axis is reversed are obtained by analyzing the numerical control programs.

10. A lost motion correcting method in a numerically controlled machine tool as set forth in claim 8, further comprising the step of using a feed rate feedback signal of the feed drive axis as a signal corresponding to the feed rate before the feed orientation of the feed drive axis is reversed, and obtaining a signal corresponding to the travelling distance before the feed orientation of the feed drive axis is reversed by performing a time integration of the feed rate feedback signal.

11. A lost motion correcting method in a numerically controlled machine tool as set forth in claim 8, further comprising the steps of using a position feedback signal of the feed drive axis as a signal corresponding to the travelling distance before the feed orientation of the feed drive axis is reversed, and obtaining a signal corresponding to the feed rate before the feed orientation of said feed drive axis is reversed by performing a time differential calculus of the position feedback signal.

\* \* \* \* \*